United States Patent [19]
Petitbon et al.

[11] Patent Number: 5,425,340
[45] Date of Patent: Jun. 20, 1995

[54] PROCESS OF MARKING CYLINDERS FOR CONTROL OF AN ELECTRONIC INJECTION SYSTEM OF AN INTERNAL COMBUSTION ENGINE

[75] Inventors: Armelle Petitbon, Paris; Jean-Marc Hornewer, Cergy-le-Haut, both of France

[73] Assignee: Regie Nationale des Usines Renault S.A., Boulogne Billancourt Cedex, France

[21] Appl. No.: 79,937

[22] Filed: Jun. 23, 1993

[30] Foreign Application Priority Data

Jun. 23, 1992 [FR] France .................. 92 07622

[51] Int. Cl.⁶ .................................................. F02D 41/34
[52] U.S. Cl. ...................................... 123/436; 123/479; 123/481; 73/117.3
[58] Field of Search ............ 123/479, 480, 481, 419, 123/414, 416, 417, 436; 73/117.3

[56] References Cited

U.S. PATENT DOCUMENTS

| | | | |
|---|---|---|---|
| 4,928,228 | 5/1990 | Fujimoto et al. | 123/479 |
| 4,930,481 | 6/1990 | Fujimoto et al. | 123/481 |
| 5,044,336 | 9/1991 | Fukui | 123/414 |
| 5,058,551 | 10/1991 | Nakaniwa | 123/479 |
| 5,156,125 | 10/1992 | Fukui et al. | 123/478 |
| 5,174,261 | 12/1992 | Fujii et al. | 123/479 |
| 5,213,081 | 5/1993 | Fujimoto | 123/436 |
| 5,221,904 | 6/1993 | Shimasaki et al. | 123/479 |
| 5,226,394 | 7/1993 | Shimasaki et al. | 123/479 |
| 5,267,544 | 12/1993 | Ohkuma et al. | 123/414 |
| 5,278,760 | 1/1994 | Ribbens et al. | 123/478 |
| 5,322,045 | 6/1994 | Hisaki et al. | 123/479 |
| 5,325,710 | 7/1994 | Morikawa | 123/414 |
| 5,357,790 | 10/1994 | Hosoya | 123/436 |

FOREIGN PATENT DOCUMENTS

3933826 4/1990 Germany.
9111599 8/1991 WIPO.

OTHER PUBLICATIONS

Patent Abstracts of Japan, vol. 12, No. 91 (M-679) Mar. 24, 1988, & JP-A-62 228 640, Oct. 7, 1987, "Decision of Misfiring of Specific Cylinder in Multi-Cylinder Engine".

Patent Abstracts of Japan, vol. 13, No. 489 (M-888), Nov. 7, 1989, & JP-A-11 95 975, Aug. 7, 1989, "Electronically Distributed Ignitor with Fail-Safe Function".

*Primary Examiner*—Henry C. Yuen
*Assistant Examiner*—Thomas N. Moulis
*Attorney, Agent, or Firm*—Oblon, Spivak, McClelland, Maier & Neustadt

[57] ABSTRACT

A system for producing a signal for marking cylinders for control of a phased sequential multipoint injection in an engine including a crankshaft sensor for providing a marking of passages of a top dead center for each of the cylinders and a system for detecting combustion misfires. The system includes the following successive steps. First, injection of fuel for a predetermined reference cylinder is stopped. An occurrence of a combustion misfire for the predetermined reference cylinder is then detected. The moment of stopping of the injection and the moment of detecting the combustion misfire is then compared, and the moment of passing of the intake or firing top dead center for the predetermined reference cylinder is identified. A signal for marking cylinders in phase with the top dead center signal is then produced, initialized at the moment of passing an intake or firing top dead center of the reference cylinder and resuming the sequence of the combustions.

6 Claims, 3 Drawing Sheets

PROCESS OF MARKING CYLINDERS FOR CONTROL OF AN ELECTRONIC INJECTION SYSTEM OF AN INTERNAL COMBUSTION ENGINE

BACKGROUND OF THE INVENTION

1. Field of the Invention

This invention relates to a process making it possible to generate a marking signal, representative of the operation of various cylinders of an internal combustion engine having several cylinders, this signal being specifically intended for the control of an electronic fuel injection system of the sequential multipoint type.

The invention relates more specifically to a process for generating a signal making possible the marking of the position of each of the various cylinders in the course of their operating cycle and in particular their passing at the intake Top Dead Center position to phase the injection accurately.

2. Discussion of the Background

To improve the operation of internal combustion engines from the viewpoint of performances and from the viewpoint of the emission of pollutants, many fuel injection systems have been developed. Among them, it is possible to cite the multipoint indirect injection systems with electronic control, such as the RENIX system or such as the L (or LH)-Jetronic system marketed by the BOSCH company.

One of the essential characteristics of the multipoint electronic injection is its intermittent operation, the injectors are actually periodically actuated: at least once per engine cycle, or else in the case of a four-stroke engine once during two crankshaft revolutions or 720° of angle. Two methods of opening the injectors have been developed: simultaneous actuation and sequential actuation.

Simultaneous or Full-Group injection consists in injecting the amount of fuel, determined by the electronic control device, by making all the injectors operate at the same time. The actuation of the injectors can be performed once per cycle (one injection every two crankshaft revolutions) or twice per cycle (one injection per crankshaft revolution). This last solution simplifies the management of the electronic control device which controls the injectors as a single control stage is necessary.

However, the Full-Group operating mode exhibits the drawback of injecting the fuel while an intake valve is still in an open position. Now, experience shows that the injection is not desirable when there is an open valve because it brings about an increase of emissions of pollutants as the injected fuel wets the plug and causes a poor initiation of the combustion.

Sequential injection consists in injecting the amount of fuel by actuating successively and in a given order the various injectors so as to inject best in each cylinder relative to the corresponding intake phase. The sequential injection is phased when the opening phase of each injector ends before the opening of the intake valve of the corresponding cylinder.

Phased sequential injection gives excellent results in terms of pollution control. Actually, the phased sequential injection makes it possible, by precisely controlling the moment of injection cylinder by cylinder, to eliminate under almost all operating conditions of the engine the direct injection of fuel in a cylinder by the open valve.

However, the multipoint electronic injection systems of the phased sequential type exhibit the drawback of producing a significant additional expense relative to a standard electronic injection installation of the "Full Group" type where all the injectors are activated simultaneously.

Actually, the phased sequential type systems particularly need to have very accurate means of marking the course of the engine cycle in each of the cylinders to make it possible for the electronic engine control unit to calculate and to control the output of each injector at a predetermined suitable moment, apart from the opening period of the corresponding valve.

It is customary, as is disclosed in French patent application FR-A-2,441,829, to mark, on a disk (or target) integral with the crankshaft, the angular position zones corresponding to a determined phase of the stroke of the various pistons. The disk exhibits marking elements placed along its periphery, such as teeth of different length, and which in passing in front of a stationary receiving element generate electric impulses making it possible to produce a signal marking the passing at the Top Dead Center position of a specific piston.

Such a marking device proves insufficient, however, for performing the control of a phased sequential injection.

Actually, for a four-stroke internal combustion engine, the crankshaft executes two complete revolutions (or 720° of angle) before a given piston regains the same operating position in the engine cycle. As a result, from observation alone of the rotation of the target integral with the crankshaft, it is not possible, a priori, to supply information on each cylinder without an uncertainty of two power strokes in the cycle (the marking of the Top Dead Center position covering both the intake phase and the firing phase).

Since the precise determination of the position of each cylinder in the cycle is not able to be deduced from the rotation of the crankshaft alone, a search for additional information is therefore necessary to know whether the cylinder is in the first or in the second half of the engine cycle (intake then compression phases during the first crankshaft revolution, firing and expansion phases during the second revolution).

To obtain such additional information, marking elements carried by a transmitting disk which rotates two times slower than the crankshaft are conventionally used. For this purpose, it is possible to place this transmitting disk on the camshaft or else on the shaft of the ignition distributor which is driven by a reduction gear of ratio ½ from the crankshaft.

Conventionally therefore, the camshaft (or else the driving pulley of the camshaft) is equipped with a target showing a reference point which works with a stationary sensor for delivering a frequency signal equivalent to "1" during the first half of the cycle and "0" during the second half. The combination of signals coming from the crankshaft sensor and from the camshaft sensor makes it possible for the system to control a phased sequential injection.

Such angular marking systems using both a crankshaft sensor and a camshaft sensor are relatively bulky, costly, and have a delicate assembly. Further, in the case where one of the sensors breaks down, i.e., in a degraded operating mode of the engine, the conventional measuring systems do not make it possible to provide enough information on the control system of the electronic injection of the engine, hence a risk of misadjustment of the latter.

SUMMARY OF THE INVENTION

This invention has as its object to overcome the difficulties of the known marking systems, necessary for the use of the phased sequential injection systems, proposing a simple and effective marking process which does not require any specific position sensor.

The process for producing a signal for marking cylinders, according to the-invention, relates to the control of a multipoint injection of the phased sequential type, for a multicylinder internal combustion engine. This signal makes possible for each cylinder the marking of a precise moment of the course of the engine cycle such as the intake Top Dead Center or the firing Top Dead Center. The engine comprises, on the one hand, a ring gear integral with the crankshaft which works with at least one sensor to provide a signal making possible the marking of the passings at the Top Dead Center of the various cylinders of the engine and, on the other hand, a system for detecting the combustion misfires able to provide a signal making possible the marking of the combustion misfires occurring in the various cylinders.

According to the invention, the process for producing a signal for marking cylinders is characterized by the following steps:

stopping the injection of the fuel for a given reference cylinder of the engine at a precise moment and for a given period;

observation, thanks to the signal for detecting combustion misfires, of the occurrence of a misfire for the reference cylinder following the noninjection and from the moment of detecting the misfire;

calculation of the number of Top Dead Centers separating the moment of stopping of the injection for the reference cylinder and the moment of detecting the combustion misfire which results from this stopping and identification by deduction, from the moment of passing at the intake or firing Top Dead Center of the reference cylinder;

production of the signal for marking cylinders, the latter, in phase with the Top Dead Center signal, being initialized at the moment of passing the intake or firing Top Dead Center of the reference cylinder and resuming the sequence of the combustions in the cylinders.

According to another characteristic of the process for producing a signal for marking cylinders that is the object of the invention, the stopping of the injection for the reference cylinder occurs after the performance of a whole number of engine cycles counting from the first passing at the Top Dead Center.

According to another characteristic of the process for producing a signal for marking cylinders, object of the invention, the stopping period of the injection for the reference cylinder is an engine cycle.

According to another characteristic of the process for producing a signal for marking cylinders according to the invention, the identification step consists in analyzing the number of Top Dead Centers separating the moment of stopping of the injection of the reference cylinder and the moment of detection. This number of Top Dead Centers is directly connected to the position of the reference cylinder in the cycle during the moment of stopping of the injection, i.e., intake Top Dead Center or firing Top Dead Center.

According to another characteristic of the process, the signal for marking cylinders is generated from the starting of the engine, in phase with the Top Dead Center signal. The cylinder marking signal is then arbitrarily initialized intake or firing Top Dead Center, during the first passing at the Top Dead Center of the reference cylinder.

According to another characteristic of the process of marking cylinders according to the invention, the step of producing the signal consists in verifying whether this signal emitted from the starting of the engine corresponds to the actuality of the course of the engine cycle in the cylinders and in reinitializing this signal, if the initial arbitrary selection is erroneous.

BRIEF DESCRIPTION OF THE DRAWING

The objects, aspects and advantages of this invention will be understood better according to the description given below of an embodiment of the invention applied to a four-stroke and four-cylinder engine, this embodiment being given by way of nonlimiting example, with reference to the accompanying drawing, in which.

DESCRIPTION OF THE PREFERRED EMBODIMENTS

Figure 1:
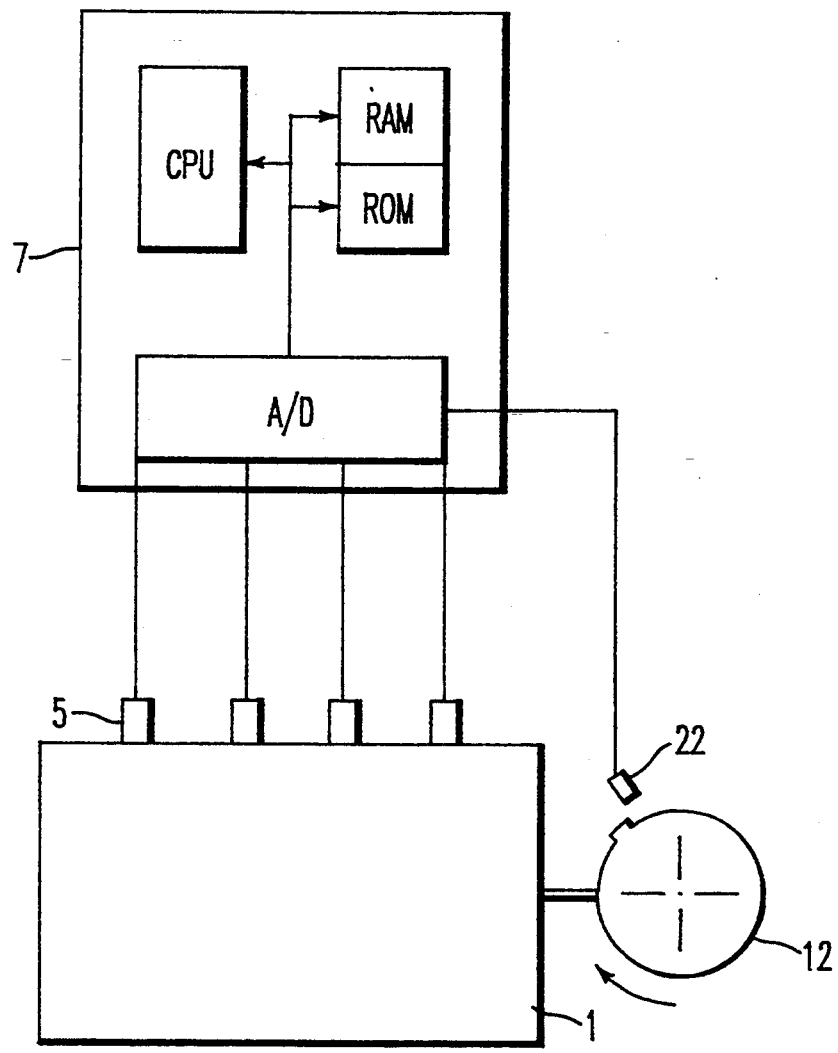
FIG. 1 is a structural diagram of the engine control device incorporating the process that is the object of this invention.

FIG. 1 specifies the configuration of an engine control system using the process of marking cylinders according to this invention. Only the constituent parts necessary for the understanding of the invention have been represented.

The internal combustion engine of the four-stroke and four-cylinder in-line type, referenced 1, is equipped with a multipoint injection device by which each cylinder is supplied with fuel by a specific electro-injector 5. The opening or sequential actuation of each electro-injector 5 is controlled by an engine control system 7, which determines the amount of fuel injected depending on the operating conditions.

Engine control system 7 conventionally comprises a computer comprising a CPU, a random access memory (RAM), a read-only memory (ROM), analog-to-digital converters (A/D) and various input and output interfaces. This engine control system receives input signals, performs operations and generates output signals particularly intended for injectors.

Of the input signals, there appear in particular those emitted by a crankshaft sensor 22 to synchronize the moments of injection with the operation of the engine.

This sensor 22, of the type, for example, with variable reluctance, which is mounted stationary on the frame of the engine, is associated with a measuring ring gear 12, integral with the inertia flywheel and comprising a certain number of marks. Sensor 22 delivers a signal Dn representative of the advance of the teeth carried by the ring gear and more particularly of the speed of advance of these teeth, i.e., representative of the instantaneous speed of the flywheel. This signal Dn, having a frequency proportional to the speed of advance of the teeth of ring gear 12, is processed by means described below for producing a signal DETEC for detecting combustion misfires and a signal TDC marking the passing at the Top Dead Center position of the cylinders of the various cylinders. The existence of a particular mark, of the missing tooth type carried by ring gear 12, makes it possible to identify the passing at the Top Dead Center of cylinders no. 1 and no. 4, on the one hand, and of cylinders no. 2 and no. 3, on the other hand (the firing order conventionally being of the 1-3-4-2 type).

It should be noted that in the example shown of an in-line four-cylinder four-stroke engine, exhibiting a firing order according to the sequence 1-3-4-2, cylinders no. 1 and no. 4 (or no. 2 and no. 3) pass simultaneously to the Top Dead Center position but with phases different from the engine cycle, one then being in intake phase and the other in firing phase.

Figure 2A:
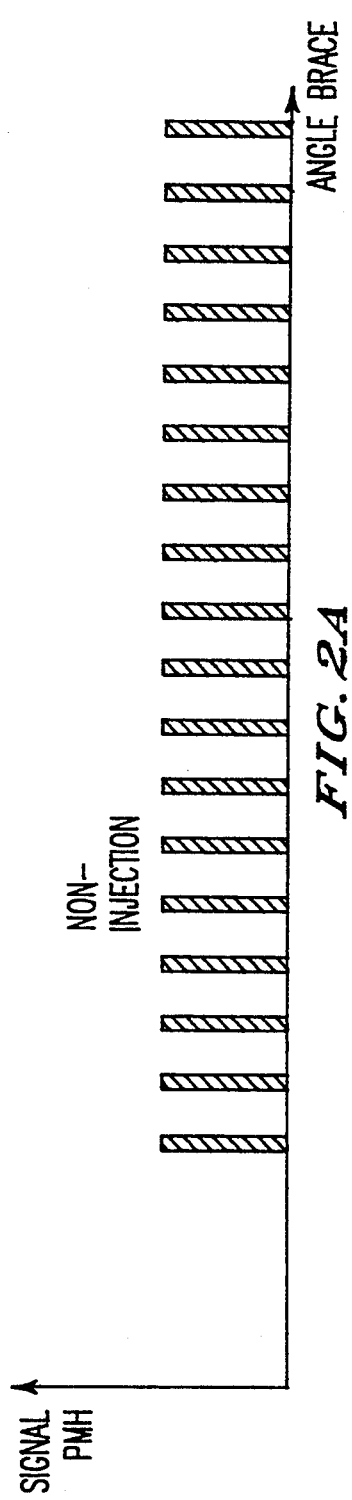
FIG. 2A-C exhibits the various timing diagrams characterizing the process that is the object of this invention.
Figure 2B:
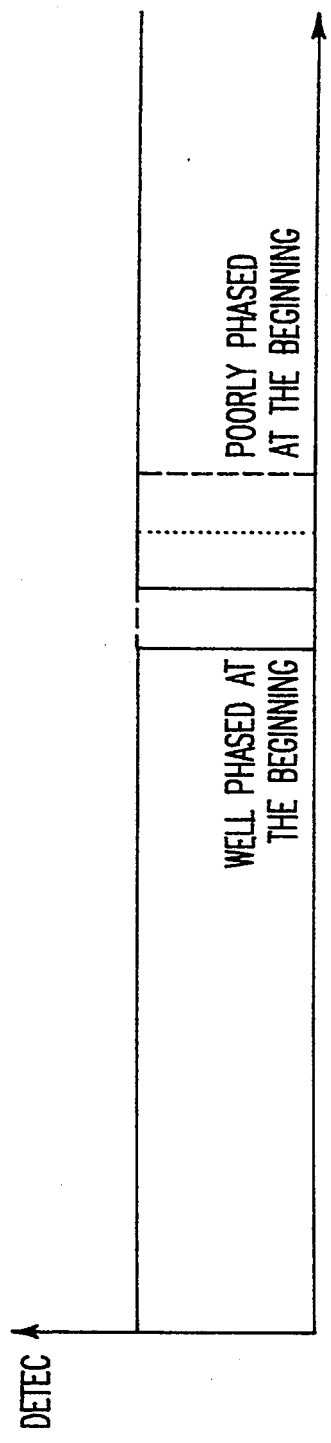
Figure 2C:
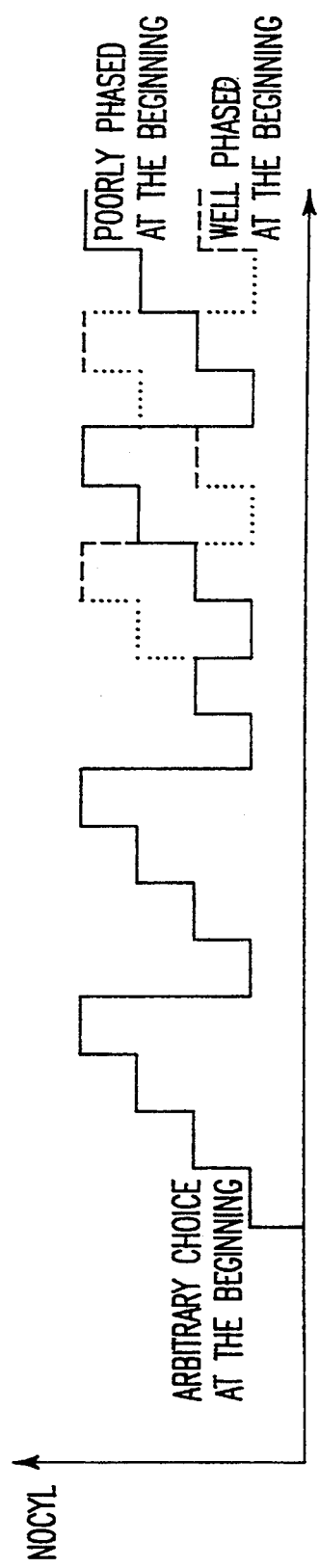

According to FIG. 2, the principle of the process of marking the course of the work cycle in each of the cylinders of the engine according to the invention is then the following. Signal Dn emitted from the starting of the engine by sensor 22 and particularly derivative signal TDC makes it possible to proceed to the control of the injectors thanks to the markings of the Top Dead Centers of each of the cylinders. To do this, a signal NOCYL synchronized with signal TDC and providing the marking of the intake Top Dead Centers of the various cylinders is used. This signal NOCYL is arbitrarily initialized at 1, at the first detection of the passing at the Top Dead Center of cylinders no. 1 and no. 4, then it is incremented (modulo four) at each Top Dead Center.

Taking into account the arbitrary selection performed during the initialization of signal NOCYL, two possibilities are offered: either signal NOCYL is well phased, the reference Top Dead Center having been used in the initialization of the signal corresponding well to an intake Top Dead Center of cylinder no. 1, or signal NOCYL is poorly phased, the reference Top Dead Center corresponding to an intake Top Dead Center of cylinder no. 4.

To remove this uncertainty, the engine having been started and operating for a certain number of cycles, a combustion misfire is deliberately caused on a reference cylinder, i.e., cylinder no. 1, by stopping the injection of fuel in this cylinder for the entire length of an engine cycle.

The next step then consists in marking, thanks to means of detection used and particularly thanks to signal DETEC, the moment of occurrence of the combustion misfire, the passing at the intake Top Dead Center of cylinder no. 1 is then deduced from it by analysis of the number of Top Dead Centers that have occurred between the moments of stopping of the injection and the moment of detection of the misfire.

This recognition of the intake Top Dead Center of cylinder no. 1 having taken place, signal NOCYL is corrected or not to make possible the marking of the intake Top Dead Centers of the various cylinders, the marking being necessary to the phased sequential injection.

Figure 3:
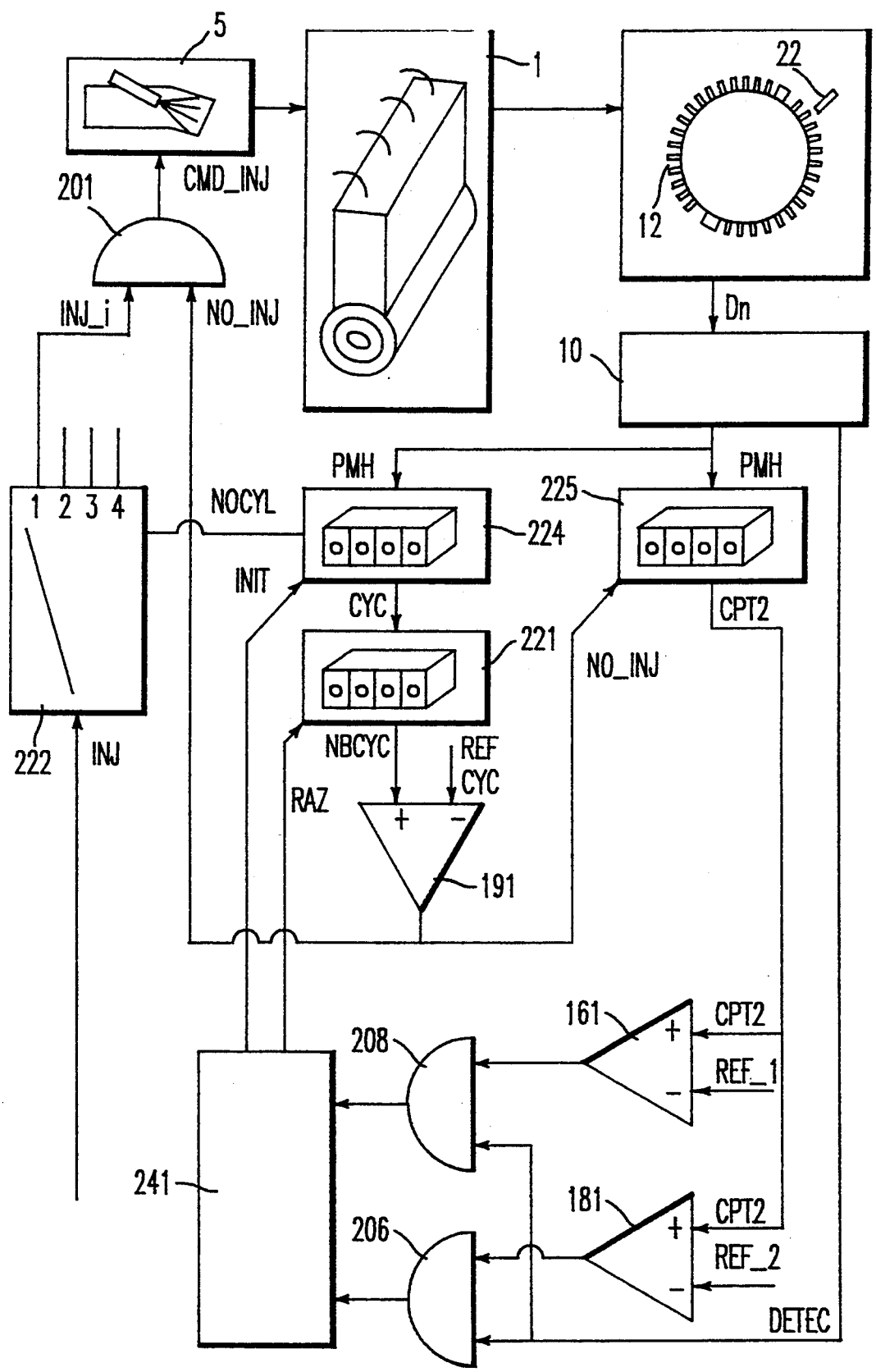
FIG. 3 is a block diagram detailing the various steps of the process that is the object of the invention.

By an operational diagram of an analog type, FIG. 3 describes the various constituent elements of an embodiment of the process according to the invention.

Engine 1 is therefore equipped with a sensor 22 mounted stationary on the frame of the engine, this sensor is associated with a measuring ring gear 12, integral with the inertia flywheel. At its periphery, ring gear 12 comprises 58 identical teeth, which are separated by a reference tooth, which has a width triple that of the other teeth. This tooth makes possible the marking of the Top Dead Center position of cylinders no. 1 and no. 4, on the one hand, and of cylinders no. 2 and no. 3, on the other hand.

Sensor 22 delivers a first signal Dn representative of the rotation of ring gear 22. A TDC signal characteristic of the passing at the Top Dead Center position of the various cylinders is deduced from it by a system for processing signal 10. This signal TDC exhibits a leading edge at each passing of the reference tooth (Top Dead Center position of cylinders no. 1 and no. 4) as well as at the passing of the thirtieth tooth following the reference tooth (Top Dead Center position of cylinders no. 2 and no. 3), this thirtieth tooth being located diametrically opposite the reference tooth.

This signal TDC supplies a software counter 224 of modulo 4 type which is incremented at each impulse corresponding to the passing of a cylinder at the Top Dead Center. During the starting of the engine, counter 224 is initialized by suitable means at value "1" from the first impulse of signal TDC corresponding to the passing of the reference tooth in front of sensor 22.

The object of this counter 224 is to control the injection by indicating continuously, during the operating phases of the engine, the cylinder number in intake phase. To do this, counter 224 delivers a signal NOCYL intended for demultiplexing unit 222 which controls various injectors 5.

This demultiplexing system 222 has as its role to determine as a function of signals INJ (coming from the calculating unit of the injection calculator responsible for working out the injection time for each of the cylinders from the operating conditions of the engine) and NOCYL, the injector to be actuated and the injection period. The demultiplexing system decodes information NOCYL as a function of the firing order which is a data item of the engine: and thus, in the selected example of the embodiment, value "1" coming from counter 224 is associated with cylinder no. 1, value "2" with cylinder no. 3, value "3" with cylinder no. 4 and value "4" with cylinder no. 2.

Counter 224 further generates a signal CYC characteristic of each return to state "1" for a second software counter 221 which thus counts the number of complete cycles of the engine. This counter 221 is reset to "0" with each engine starting by a suitable command.

The contents of counter 221, NBCYC are processed by comparator means 191 at a predetermined reference value REFCYC (for example, 100) to produce a control signal NO-INJ. This reference value REFCYC characteristic of the engine, is optionally able to change depending on the operation of the engine.

Signal NO-INJ has as its object to block the operation of the injector corresponding to cylinder no. 1, taken arbitrarily as reference cylinder, during a cycle, when counter 221 has reached value REFCYC. To do this, the output intended for injector no. 1 of demultiplexer 222 is connected with the output of comparator 191 to the inputs of an AND gate 201, the output of AND gate 201 being connected to injector no. 1.

Simultaneously with the cutoff of injector no. 1, signal NO-INJ produces the turning on and the initialization of a third software counter 225. This counter is fed with signal TDC and is therefore incremented at each impulse corresponding to the passing of a cylinder at the Top Dead Center. The initialization of counter 225 is performed so as to take value "1" from the first impulse of signal TDC depending on the turning-on order transmitted by signal NO-INJ.

Data CPT2 contained in counter 225 is then compared to two reference values REF-1 and REF-2 for producing a marking signal detecting the moments of passing of two predetermined numbers of Top Dead Centers subsequent to the blocking decision of injector no. 1.

The contents of counter 225 are therefore processed by comparator means 161 and 181 at predetermined values REF-1 and REF-2 for producing signals characteristic of the state at REF-1 or at REF-2 of counter 225. These values REF-1, REF-2 are selected for the example described, respectively equal to "6" and to "8".

These characteristic signals are then compared with a signal DETEC for marking combustion misfires described below, by a group of logic gates so as to detect the coincidence between signal DETEC and therefore the occurrence of a combustion misfire, and the state at "6" or "8" of counter 225, and depending on the result of this comparison, counter 224 is reinitialized or not.

The comparison with signal DETEC is performed by two "AND" gates 206 and 208 whose inputs are respectively connected to signal DETEC and to the output of comparator 161, on the one hand, and to signal DETEC and to the output of comparator 181, on the other hand. The outputs of gates 206 and 208 are then connected to a system 241 able to analyze the signals thus produced and to generate a signal INIT intended for counter 224 optionally to modify the contents of the latter.

The obtaining of signal DETEC is brought about by processing signal Dn by a system for processing signal 10. First of all, signal Dn is processed by measuring means suitable for producing a value of the gas torque produced by each of the combustions of the gas mixture in the cylinders of the engine. The gas torque is particularly obtained from the analysis of line four of the spectrum of signal Dn delivered by stationary sensor 22 observing gear wheel 12 integral with the crankshaft.

The successive values of gas torque Cg, calculated after each combustion by measuring means, are then taken up by means of detecting combustion misfires. These detecting means perform, from each torque value, the calculation of a statistical magnitude representative of the average of the torque values on a given number of combustions and compares the torque value to a threshold value deduced from the statistical magnitude for producing a signal DETEC indicating the existence of a combustion misfire when the torque value is less than the threshold value.

This signal DETEC thus exhibits after each combustion (with a delay due to the process method used for a two-stroke engine or 360° crankshaft) a logic level at 1 in case of combustion and at 0 in case of noncombustion.

According to the preceding description, the use of the device is then as follows.

During the starting of the engine, counter 224 is initialized arbitrarily at "1" from the first impulse of signal TDC corresponding to the detection of the reference tooth. This arbitrary selection brings about an uncertainty as cylinder 1 is able to be at intake or firing Top Dead Center. Nevertheless, signal NOCYL is used indirectly for controlling the injection sequentially. This uncertainty is taken into account, however, in the law of control to avoid any injection, intake valve open.

When the engine has rotated for a predetermined whole number of cycles equal to REFCYC, to stabilize the engine, the injection of cylinder no. 1 is blocked for the length of an engine cycle by signal NO-INJ and simultaneously the incrementation at each Top Dead Center of counter 225 is initially freed at "1".

The decision for cutoff of the injection is therefore blocked while cylinder no. 1 is at Top Dead Center (the incrementation of counter 221 being performed during the return to "1" of counter 224 corresponding to the passing of tooth 18 in front of sensor 22).

Two cases can then occur:
  either cylinder no. 1 is actually in intake phase and the absence of firing resulting from noninjection will occur only six power strokes after (or six Top Dead Centers marked by signal TDC) and will appear on DETEC only eight strokes after, taking into account the detection delay of two strokes.
  or cylinder no. 1 is in firing phase and the absence of firing resulting from the noninjection will occur only four engine cycles after (or four Top Dead Centers marked by signal TDC) and will appear on DETEC only six cycles after, taking into account the delay of detection of two cycles.

It therefore suffices to compare whether the detection of the created combustion misfire coincides with value "6" or "8" of counter 225 for deducing the exact position of cylinder no. 1 and accordingly to modify counter 224. Thus, if the detection of the combustion misfire coincides with value "6," it is deduced from it that cylinder no. 1 was in a firing phase during the cutoff of the injection, value 3 is then replaced by value 1 so that counter 224 provides the intake Top Dead Center information. And if the detection-of the combustion misfire coincides with value "8," it is deduced from it that cylinder no. 1 was in an intake phase and therefore that counter 224 correctly supplies the intake Top Dead Center information and therefore that no modification of the latter is necessary.

If the system detects a combustion misfiring both at "6" and at "8," in the case of a parasitic combustion misfire that has occurred in the detection window, the entire process of detection is repeated, for example by modifying value REFCYC by suitable means.

The recognition process can be completed by a monitoring procedure which makes it possible to check regularly whether counter 224 offers accurate information. To do this, several solutions are possible, the simplest consisting in having a counter 221 of modulo N type, the marking of the intake Top Dead Center of cylinder no. 1 then taking place every REFCYC+p*N cycle with p=1, 2, 3, 4 . . . .

Of course, the invention is in no way limited to the described and illustrated embodiment which has been given only by way of example.

On the other hand, the invention comprises all the technical equivalents of the means described as well as their combinations if the latter are made in its spirit.

Thus, it is possible to use this process with a signal NOCYL for control of the injectors no longer using the marking of the passings at the intake Top Dead Center of the various cylinders but the marking of the passings at the firing Top Dead Center. In this case, when the detection of the combustion misfire coincides with value "6," it is deduced from it that signal NOCYL is well phased and when the detection of the combustion misfire coincides with value "8," it is deduced from it that signal NOCYL is poorly phased.

Thus, it is possible to perform the detection of the combustion misfires independently of the measuring of the average gas torque, for example, by simple observation of the acceleration of ring gear 12.

With regard to the use of the device for detecting the combustion misfires, regardless of the embodiment selected, it can be achieved in various forms:

either with analog electronic components for which the adders, comparators and other filters are produced with operational amplifiers;

or with digital electronic components which would perform the hardwired logic function;

or by an algorithm for processing the signal installed in the form of a component software module of a software system for engine control causing the microcontroller of a computer to operate, or else, by a specific (custom) chip whose hardware and software resources will have been optimized to perform the functions that are the object of the invention:

microprogrammable chip or not, encapsulated separately or else all or part of a coprocessor installed in a microcontroller or microprocessor, etc.

Also, the invention comprises all the technical equivalents applied to an internal combustion engine regardless of its combustion cycle, the fuel used diesel or gasoline or else the number of its cylinders.

We claim:

1. A method for producing a signal for marking cylinders for controlling a phased sequential multipoint injection equipping a multicylinder internal combustion engine comprising a ring gear integral with a crankshaft, at least one sensor provided on the crankshaft to provide a first signal for marking passings of a top dead center of the cylinders of the engine and a system for detecting combustion misfires to generate a second signal for marking the combustion misfires in the cylinders, comprising the steps of:

stopping injection of fuel for a predetermined reference cylinder of the engine at a predetermined moment and for a predetermined time period;

detecting, based on said second signal for detecting combustion misfires, an occurrence of a misfire for said predetermined reference cylinder following the stopping of the injection;

detecting a total number of first signals between the predetermined moment of stopping of the injection for the predetermined reference cylinder and the moment of detecting the combustion misfire; and calculating a signal indicating a marking of the cylinders based on the detected total number of first signals.

2. The method for producing a signal for marking cylinders according to claim 1, wherein the step of stopping the injection for the predetermined reference cylinder occurs after a whole number of engine cycles counting from a first detection of the first signal.

3. The method for producing a signal for marking cylinders according to either one of claims 1 or 2, wherein the predetermined stopping period of the injection for the predetermined reference cylinder is one engine cycle.

4. A system for producing a signal for marking cylinders for controlling a phased sequential multipoint injection equipping a multicylinder internal combustion engine comprising:

a ring gear integral with a crankshaft;

at least one sensor provided on the crankshaft to provide a first signal for marking passings of a top dead center of the cylinders of the engine;

a system for detecting combustion misfires to generate a second signal for marking combustion misfires in the cylinders;

means for stopping injection of fuel for a predetermined reference cylinder of the engine at a predetermined moment for a predetermined time period;

means for detecting, based on said second signal for detecting combustion misfires, an occurrence of a misfire for said predetermined reference cylinder following the stopping of the injection;

means for detecting a total number of first signals between the predetermined moment of stopping of the injection for the predetermined reference cylinder and the moment of detecting the combustion misfire; and means for calculating a signal indicating a marking of the cylinders based on the detected total number of first signals.

5. The system for producing a signal for marking cylinders according to claim 4, wherein the stopping of the injection for the predetermined reference cylinder occurs after a whole number of engine cycles counting from a first detection of the first signal.

6. The system for producing a signal for marking cylinders according to either one of claims 4 or 5, wherein the predetermined stopping period of the injection for the predetermined reference cylinder is one engine cycle.

* * * * *